United States Patent [19]

Tutein et al.

[11] 4,088,600
[45] May 9, 1978

[54] DEMULSIFICATION USING CATIONIC STARCHES OF THE QUATERNARY AMMONIUM TYPE

[75] Inventors: Thomas R. Tutein, Cary; Anne E. Harrington, Chicago; Jose T. Jacob, Lake Zurich, all of Ill.

[73] Assignee: Chemed Corporation, Cincinnati, Ohio

[21] Appl. No.: 746,160

[22] Filed: Nov. 30, 1976

[51] Int. Cl.$^2$ .............................................. B01D 17/04
[52] U.S. Cl. .................................... 252/344; 106/211; 106/213; 252/338; 252/358
[58] Field of Search ....................... 106/210, 211, 213; 252/344, 338, 358; 536/50

[56] References Cited

U.S. PATENT DOCUMENTS

| | | | |
|---|---|---|---|
| 2,050,924 | 8/1936 | De Groote | 252/344 |
| 2,258,320 | 10/1941 | Ericks | 252/344 |
| 2,876,217 | 3/1959 | Paschall | 536/50 |
| 2,995,512 | 8/1961 | Weidner et al. | 252/344 |
| 3,467,647 | 9/1969 | Benninga | 106/210 |
| 3,487,928 | 6/1970 | Canevari | 210/40 |
| 3,830,735 | 8/1974 | Tsuk | 252/358 |

Primary Examiner—Lorenzo B. Hayes
Attorney, Agent, or Firm—Charles L. Harness

[57] ABSTRACT

Oil-in-water or water-in-oil emulsions can be demulsified with cationic starches of the quaternary ammonium type.

8 Claims, No Drawings

DEMULSIFICATION USING CATIONIC STARCHES OF THE QUATERNARY AMMONIUM TYPE

This invention relates to demulsification of oil-in-water emulsions and water-in-oil emulsions, using cationic starches of the quaternary ammonium type.

CATIONIC STARCHES

Cationic starches fall into two types, tertiary aminoalkyl ethers and quaternary ammonium alkyl ethers. Only the second type has been found operable in this invention.

The preparation of cationic starch quaternary ammonium ethers is well known in the art. They are prepared by reacting starch and, e.g., a quaternary halohydrin salt with an alkali. Re preparation, see *Starch: Chemistry and Technology*, Whistler, R. L., and Paschall, E. F., eds., Chapter 16, Production and Uses of Cationic Starches, by Paschall, E. F. (1967). The present invention relates to the use of these cationic starches as demulsifiers for breaking oil-in-water and water-in-oil emulsions. It is found that the quaternary ammonium cationic starches are very effective and inexpensive as demulsifiers when compared to, e.g., polyamine and polyimine based demulsifiers.

The quaternary ammonium cationic starches consist mainly of two moieties, the starch group and the quaternary ammonium salt group. With regard to the starch group our invention is applicable to all quaternary ammonium cationic starches prepared from all starches and starch fractions, particularly acid or enzyme modified corn or waxy starches. Specifically, it is applicable to starches prepared from corn, potato, tapioca, sago, rice, wheat, waxy maize, grain sorghum, grain starches in raw or modified forms, e.g., modified with acid, oxidizing agent and the like; to amylose and amylopectin; and to the linear and branched components, respectively, of corn starch; and also to dextrins. Accordingly, by "starch" is meant the term in its customary generic sense.

The quaternary reactant is a quaternary ammonium compound of the general formula:

(Formula I)

in which $X^-$ is any monovalent anion, e.g., chloride, bromide, iodide, or methyl sulfate; Y is from the group consisting of 2,3-epoxy propyl, 3-halo-2-hydroxy propyl, 2 chloroethyl, o, p or m ($\alpha$ hydroxy -$\beta$halo ethyl) benzyl; $R_1$, $R_2$ and $R_3$ are from the group consisting of hydrogen, hydroxyl, alkyl, substituted alkyl, aryl and aralkyl; in which two of the R's may be joined to form a hetercyclic or a homocyclic ring compound; in which the total number of carbons in all three of $R_1$, $R_2$ and $R_3$ should not exceed about 14 carbons. If all three of $R_1$, $R_2$ and $R_3$ are different and $R_3$ contains more than 3 carbon atoms but not more than 12, then $R_1$ and $R_2$ should preferably be from the group consisting of methyl and ethyl; and if $R_1$ and $R_2$ are joined to form a ring compound, $R_3$ should preferably not be greater than ethyl.

The reaction to make the cationic starch involves the hydroxyl groups on the starch molecule and the reactive Y group of the quaternary ammonium reactant, s that the resulting cationic starch product has the formula

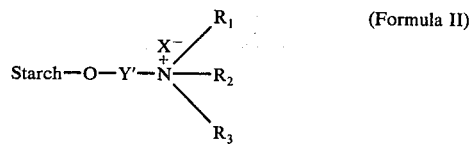

(Formula II)

in which Y' is the reaction residue of Y and X and the R→s are unaltered. Y' would thus be (typically) 2 hydroxyl propyl, ethyl, or o, p or m ($\alpha$ hydroxy-$\beta$halo ethyl) benzyl.

In a typical case, using N-(3-chloro-2-hydroxypropyl) trimethylammonium chloride, the reaction may proceed simplistically as Starch — OH + Cl $CH_2$ — CH(OH) — $CH_2$ $N^+(CH_3)_3Cl^-$ + NaOH→
Starch — O — $CH_2$ — CH(OH) — $CH_2N^+(CH_3)_3Cl^-$ + NaCl + $H_2O$.

Typical industrial applications where the instant invention is useful include petroleum industry; metal working industry such as machine shops, automotive assembly plants, roller-bearing plants, transmission plants; and ore processing and other related industries.

EXAMPLES

A number of quaternary ammonium cationic starches were prepared in the known way by reacting modified corn starch with varying amounts of N- (3-chloro-2-hydroxy propyl) trimethyl ammonium chloride, with sodium hydroxide as catalyst. The degree of substitution (D.S.) of these products is calculated theoretically and is found to be in the range of 0.1 to 0.45. The degree of substitution is defined as a number of moles of quaternary ammonium substituent, in this case

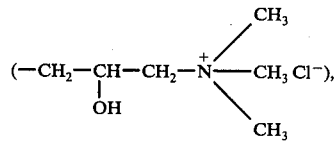

per anhydroglucose unit.

These compounds were tested on synthetic oil-in-water emulsions. The test oil emulsion was made in the laboratory to serve as an easily prepared quantitatively reproducible source of a typical waste water. This was made by mixing 42.5% mineral seal oil, 37.6% oleic acid and 19.9% Triton Cf-10. Triton CF-10 is the trademark of Rohm and Haas Corp. for a water-soluble benzyl ether of octyl phenol condensed with ethylene oxide.

For each test, the synthetic test oil was diluted to 2500 mg per liter of Lake Zurich, Illinois, tap water and stirred with various amounts of quaternary ammonium cationic starches for 10–12 minutes. A portion of the treated sample was removed by a wide tip pipette, placed in a colorimetric tube, and the percent light transmission (%T) was read at 490 m$\mu$ by Lumetron Colorimeter. The effectiveness of the treatments for breaking the emulsions was determined by comparing the %T of the test solution before and after the treatment. The results are tabulated in Table I. As is evident from the table, the quaternary ammonium cationic starches are very effective demulsifiers.

TABLE I

Results of cationic starches as demulsifiers on 2500 mg synthetic oil emulsions per liter of Lake Zurich tap water using Lumetron Spectrophotometer at 490 m=

| Treating Chemical | Degree of Substitution | Treating Dosage, ppm | Percent Light Transmission (%T) |
|---|---|---|---|
| None (Control) | — | None | 6 |
| Polyethyleneimine (Comparison) | — | 100 | 53 |
| Cationic starch 1 | .15 | 25–50 | 82–90 |
| Cationic starch 2 | .40 | 25–50 | 82–90 |
| Cationic starch 3 | .30 | 25–50 | 82–90 |
| Cationic starch 4 | .10 | 50–75 | 82–90 |
| Cationic starch 5 | .25 | 25–50 | 82–90 |
| Cationic starch 6 | .35 | 25–50 | 82–90 |
| Cationic starch 7 | .20 | 50–75 | 82–90 |
| Cationic starch 8 | .30 | 25–50 | 82–90 |
| Cationic starch 9 | .40 | 10–20 | 82–90 |
| Cationic starch 10 | .40 | 10–20 | 82–90 |

The treating dosage is generally effective in the range of 0.5 mg to 80,000 mg per liter of emulsion. A more preferred range is 5 mg to 8000 mg per liter (1 mg/liter = 1 ppm.)

The quaternary ammonium cationic starches are useful in demulsifying substantially all oil-in-water emulsions, and are likewise (on information and belief) considered useful in demulsifying substantially all water-in-oil emulsions.

As regards the quaternary ammonium cationic starches, the degree of substitution can be within the range of about 0.01 to 0.75 quaternary units conforming to Formula II given above, per anhydroglucose unit in the starch group. Preferably it is about 0.1 – 0.45.

The main prior art use of cationic starches is in flocculation. The cationic starches are also known to be emulsifying agents (e.g., for paper sizing agents, Paschall, p. 416), and it was not to be expected that a group of them could function in the opposite sense, as demulsifiers. The invention is believed unobvious also in that the tertiary amine cationic starches, which are of course closely related to the instant quaternary ammonium cationic starches, are relatively ineffective as demulsifiers.

We claim:

1. The process of demulsifying an emulsion consisting essentially of oil and water comprising treating same with a quaternary ammonium cationic starch.

2. The process of claim 1 in which the emulsion is oil-in-water.

3. The process of claim 1 in which the emulsion is water-in-oil.

4. The process of claim 1 in which the quaternary ammonium cationic starch has the formula

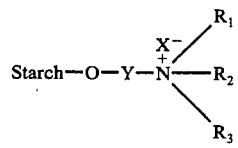

in which $X^-$ is a monovalent anion from the group consisting of chloride, bromide, iodide, or methyl sulfate; Y is from the group consisting of 2 hydroxy propyl, ethyl, or $o$, $p$, or $m$ ($\alpha$ hydroxy-$\beta$halo ethyl) benzyl; $R_1$, $R_2$ and $R_3$ are from the group consisting of hydrogen, hydroxyl, alkyl, substituted alkyl, aryl and aralkyl; in which two of the R's may be joined to form a heterocyclic or a homocyclic ring compound; in which the total number of carbons in all three of $R_1$, $R_2$ and $R_3$ does not exceed about 14 carbons; with the proviso that if all three of $R_1$, $R_2$ and $R_3$ are different and $R_3$ contains more than 3 carbon atoms but not more than 12, then $R_1$ and $R_2$ are from the group consisting of methyl or ethyl; and if $R_1$ and $R_2$ are joined to form a ring compound, $R_3$ is methyl of ethyl.

5. The process of claim 4 in which the quaternary ammonium cationic starch has the formula

and the degree of substitution is 0.01 to 0.75.

6. The process of claim 5 in which the degree of substitution is about 0.1 – 0.45.

7. The process of claim 1 in which the quaternary ammonium cationic starch is added to the emulsion at the rate of about 0.5 mg to 80,000 mg/liter.

8. The process of claim 7 in which the rate is 5 mg to 8000 mg per liter.

* * * * *